(12) United States Patent
Ahuja et al.

(10) Patent No.: US 6,501,934 B1
(45) Date of Patent: Dec. 31, 2002

(54) TRANSFER/TRANSFUSE MEMBER HAVING INCREASED DURABILITY

(75) Inventors: Suresh K. Ahuja, Webster, NY (US); Richard B. McGriff, Webster, NY (US); Timothy J. Waldnig, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/697,216

(22) Filed: Oct. 26, 2000

(51) Int. Cl.⁷ ................. G03G 15/16; G03G 15/20
(52) U.S. Cl. ..................... 399/307; 399/313
(58) Field of Search .................. 399/297, 302, 399/303, 307, 308, 312, 313; 428/323, 324, 325, 331, 421, 422; 430/126

(56) References Cited

U.S. PATENT DOCUMENTS

| | | | |
|---|---|---|---|
| 4,235,835 A | * 11/1980 | Stutzman et al. | 264/328.2 |
| 4,511,622 A | * 4/1985 | Seimiya et al. | 428/323 |
| 4,670,967 A | 6/1987 | Hazuki | 29/576 B |
| 4,760,296 A | 7/1988 | Johnston et al. | 310/45 |
| 5,034,777 A | * 7/1991 | Ohzeki et al. | 399/66 |
| 5,409,557 A | * 4/1995 | Mammino et al. | 156/137 |
| 5,556,899 A | * 9/1996 | Afzali-Ardakani et al. | 252/502 |
| 5,599,648 A | * 2/1997 | Kondo et al. | 101/463.1 |
| 5,761,595 A | * 6/1998 | Tarnawskyj et al. | 399/308 |
| 5,873,018 A | * 2/1999 | Aoto et al. | 399/302 |
| 5,991,590 A | 11/1999 | Chang et al. | 399/302 |
| 6,066,400 A | * 5/2000 | Law et al. | 428/412 |
| 6,078,773 A | * 6/2000 | Shimojo et al. | 399/302 |
| 6,297,302 B1 | * 10/2001 | Heeks et al. | 524/262 |

* cited by examiner

Primary Examiner—Robert Beatty
(74) Attorney, Agent, or Firm—Oliff & Berridge, PLC; Eugene Palazzo (57) ABSTRACT

Transfer members useful in electrostatographic reproducing apparatus, including digital, image-on-image and contact electrostatic printing apparatus. The transfer members feature a substrate comprising a nanosize polymer material and can be used as transfer members, transfuse, transfix members, or transport members.

46 Claims, 3 Drawing Sheets

TRANSFER/TRANSFUSE MEMBER HAVING INCREASED DURABILITY

BACKGROUND OF THE INVENTION

The present invention relates to transfer members useful in electrostatographic reproducing apparatus, including digital, image-on-image and contact electrostatic printing apparatus. The present transfer members can be used as transfer members, transfuse or transfix members, transport members, and the like.

In a typical electrostatographic reproducing apparatus such as electrophotographic imaging systems using a photoreceptor, a light image of an original to be copied is recorded in the form of an electrostatic latent image upon a photosensitive member and the latent image is subsequently rendered visible by the application of a developer mixture. Generally, the toner is made up of resin and a suitable colorant, such as a dye or a pigment. Conventional charge director compounds may also be present. The developer material is brought into contact with the electrostatic latent image and the colored toner particles are deposited thereon in image configuration.

The developed toner image recorded on the imaging member is transferred to an image receiving substrate, such as paper, via an transfer member. The toner particles may be transferred by heat and/or pressure to an transfer member, or more commonly, the toner image particles may be electrostatically transferred to the transfer member by means of an electrical potential between the imaging member and the transfer member. After the toner has been transferred to the transfer member, it is then transferred to the image receiving substrate, for example by contacting the substrate with the toner image on the transfer member under heat and/or pressure.

Polymeric transfer members, e.g., transfix/transfuse belts are used in the art. Certain materials such as polyimides are used in transfix belts are preferred because of the high temperature stability, toughness, flexibility and low thermal expansion provided by this material. However, under typical operating conditions in electrophotographic apparatus, slippage exists with current polyimide belts upon thermal cycling. To illustrate, the thermal expansion coefficient of a polyimide belt is enough to expand the belt dimensions from, e.g., a nominal dimension of 97×30 in$^2$ at ambient temperature to 97.1×30.1 in$^2$ at a typical operating temperature of 120° C. To compensate for this problem, the belt is typically placed under higher tension, leading to a life shortfall and machine downtime due to maintenance calls.

SUMMARY OF THE INVENTION

The present invention relates to transfer members for electrophotography which are more durable and have longer life, and are also easier to fabricate compared to those which have come before it.

Transfer members of the invention feature a substrate comprising a nanosize polymer material. The nanosize polymer material may be a particulate organically modified mica, e.g., muscovite, lepidolite, phlogopite or glauconite; a particulate organosilicate clay filler material such as organically modified talc-type silica (OMTS) in nanosize particulate form, or organically modified bentonite, e.g., montmorillonite; allophane; kaolinite; halloysite; illite; chlorite; vermiculite; sepiolite; attapulgite; palygorskite; and mixed-layer clay minerals in nanosize particulate form. The substrate may be a thermosetting or a thermoplastic resin e.g., epoxy resins (diglycidyl ether of bisphenol A); polyethyleneterephthalate (PET), polyvinylfluoride, urethane rubber, polytetrafluoroethylene, or a polyimide. The substrate preferably includes a polyimide material. The amount of nanosize polymer material in the substrate is generally lower than about 10% by weight, advantageously between about 10% and 5% by weight, and more advantageously at least about 5% by weight.

The invention further relates to apparatus for forming images on a recording medium. Such image forming apparatus include a charge-retentive surface to receive an electrostatic latent image; a development component to apply a developer material to the charge-retentive surface to form a developed image on the charge retentive surface; and a transfer component to transfer the developed image from the charge retentive surface to a copy substrate. The apparatus may also include a fixing component to fuse the transferred developed image to the copy substrate. The fixing component may be separate from the transfer component, or one element may serve both functions. The transfer member preferably includes a substrate containing a filler material adapted for reducing the thermal expansion coefficient of the transfer component.

DETAILED DESCRIPTION OF THE INVENTION

Electrophotographic transfer members possessing qualities required for optimum function, e.g., higher modulus, lower thermal expansion, excellent electrical properties, good flex life, decreased costs wear resistance, cleanability and seamability are desired. There are several root causes in reducing belt life, creep, sagging and cracking of belt as well as seam failure. The present invention addresses these needs, and provides a transfer member which is more durable than those which have come before it. In previous attempts to solve the problem of belt slippage and/or expansion using polyimide belts, conventional silica fillers have been employed. Such conventional silica fillers have been used in an amount of about 20–40 weight %. However, the resulting structures do not exhibit satisfactory life. Moreover, the belt gloss, an important property in transfer belts for determining the quality of toner spreading and transfer and also a determinant of belt life, has also been found to be unsatisfactory using conventional silica, alumina or mineral fillers, e.g., hydrosilicates such as zeolite.

Transfer members of the invention feature a substrate comprising a nanosize polymer material. The nanosize polymer material may be a particulate organically modified mica, e.g., muscovite, lepidolite, phlogopite or glauconite; a particulate organosilicate clay filler material such as organically modified talc-type silica (OMTS) in nanosize particulate form, or organically modified bentonite, e.g., montmorillonite; allophane; kaolinite; halloysite; illite; chlorite; vermiculite; sepiolite; attapulgite; palygorskite; and mixed-layer clay minerals in nanosize particulate form having a large aspect ratio generally between 1:100 to 1:1000. "Nanosize" includes particulate organosilicate clays generally of about 1 nm thickness and lateral dimensions in the range of lateral 50–1000 nm, preferably 200–1000 nm, more preferably 200–400 nm.

"Cleanability" includes the ability to clean toner from electrophotographic surfaces with, e.g., nanocomposite smooth surfaces, enabling reduction in friction between the cleaning part, blade or brush, and the surface. "Seamability" refers to the ability of a material to make a connection between the ends of the belt by means of, e.g., ultrasound and other energy sources, with smooth surfaces forming a strong joint and thus reducing the probability of seam failure.

The nanosize polymer material may be an organophilic clay. "Organophilic clay" includes layered minerals such as particulate organically modified mica, e.g., muscovite, lepidolite, phlogopite or glauconite; or organically modified bentonite, e.g., montmorillonite; allophane; kaolinite; halloysite; illite; chlorite; vermiculite; sepiolite; attapulgite; palygorskite; and mixed-layer clay minerals in nanosize particulate form which have been intercalated with organic cations. Exemplary cations include onium cations, e.g., higher (including $C_4$ to $C_{20}$ alkyl) alkylammonium ions like laurylammonium, palmitylammonium, and stearylammonium. Desirably the clay from which the organophilic clays are prepared have a cation exchange capacity from 50 to 300 milliequivalents per 100 grams of clay.

The intercalation of the layered minerals in the substrate is a consequence of replacing inorganic ions intercalated between mineral layers of the clay with organic ions. The presence of the intercalated organic cations is believed to advantageously finely disperse the mineral in the material from which the substrate material of the invention may be made, e.g., a solution of polyamic acid, which is a polyimide prepolymer. The small size, packing and orientation of the organophilic clay in the film is believed to increase the film strength and the films ability to act as a heat, gas and moisture barrier, which is not feasible with ordinary filler materials.

In a particularly preferred embodiment, a transfer member of the invention features OMTS filler material dispersed in a polyimide matrix, wherein the addition of the filler lowers the expansion coefficient of the transfer member from about 60 to about 38 PPM/°C. at 150° C.

The material useful as the substrate must have good dimensional stability and resistance to attack by materials of the toner or developer, be suitable for allowing a high operating temperature, possess electrical insulating properties, and be conformable to an image receiving substrate such as paper. The substrate material should also exhibit high mechanical strength and provide heat insulating properties, the latter of which in turn, improves the thermal efficiency of the fusing system. In addition, the substrate should have a high flexural strength, e.g., about 2,000,000 to about 3,000,000 psi, and a flexural modulus of from about 25,000 to about 55,000 psi. The substrate should also be resistant to absorption of gases coming from corona exposure and thus resistant to chemical degradation and cracks. Examples of suitable substrate materials include thermosetting or a thermoplastic resins, e.g., epoxy resins (diglycidyl ether of bisphenol A); polyimides, e.g., KEVLAR® (du Pont); polyamides, such as nylon or polyphenylene isophthalamide, e.g., NOMEX® (du Pont), polyesters, polycarbonates, polyacryls, polystyrenes, polyethylenes, polyethyleneterephthalates (PETs), polyvinylfluorides, urethane rubbers, polytetrafluoroethylenes, and polypropylenes.

Preferably, the substrate is comprised of a suitable high elastic modulus material such as a polyimide. The material should be capable of becoming conductive upon the addition of electrically conductive particles. A polyimide having a high elastic modulus is preferred because the high elastic modulus optimizes the stretch registration and transfer or transfix conformance. Polyimides have the advantages of improved flex life and image registration, chemical stability to liquid developer or toner additives, thermal stability for transfix applications and for improved overcoating manufacturing, as well as improved solvent resistance as compared to known materials used for film for transfer components.

Suitable polyimides include those formed from various diamines and dianhydrides, such as poly(amide-imide), polyetherimide, and siloxane polyetherimide block copolymer such as, SILTEM STM-1300 (GE Plastics). Preferred polyimides include aromatic polyimides such as those formed by the reacting pyromellitic acid and diaminodiphenylether sold under the tradename KAPTON®-type-HN (du Pont). Another suitable polyimide, KAPTON®-Type-FPC-E, is produced by imidization of copolymeric acids such as biphenyltetracarboxylic acid and pyromellitic acid with two aromatic diamines such as p-phenylenediamine and diaminodiphenylether. Another suitable polyimide includes pyromellitic dianhydride and benzophenone tetracarboxylic dianhydride copolymeric acids reacted with 2,2-bis[4-(8-aminophenoxy)phenoxy]-hexafluoropropane available as EYMYD type L-20N (Ethyl). Other suitable aromatic polyimides include those containing 1,2,1',2'-biphenyltetracarboximide and para-phenylene groups such as UPILEX®-S (Uniglobe Kisco, Inc.), and those having biphenyltetracarboximide functionality with diphenylether end spacer characterizations such as UPILEX®-R. Mixtures of polyimides can also be used.

The polyimide is present in the film in an amount of from about 60 to about 99.9 percent by weight of total solids, preferably from about 80 to about 90 percent by weight of total solids. "Total solids" includes the total percentage by weight of polymer, conductive fillers and any additives in the layer. The polyimide may also contain a resistive filler such as carbon black, graphite, boron nitride, metal oxides such as copper oxide, zinc oxide, titanium dioxide, silicone dioxide, and the like.

The amount of nanosize polymer material in the substrate is generally lower than about 20% by weight, advantageously between about 10% and 2% by weight, and more advantageously at least about 5% by weight.

The transfer member of the invention may optionally comprise a two layer configuration having a substrate onto which one or more additional layers are disposed, such as an outer rubber layer and/or a release agent material layer. The outer layer may comprise a suitable high elastic modulus material such as a silicone rubber material. The material may be capable of becoming conductive upon the addition of electrically conductive particles. Silicone rubber has good flex life and image registration, chemical stability, and thermal stability. Silicone rubber further provides for lower pull force which allows the material to perform well in transfix and transfuse applications. The low pull force is believed to be a function of low adhesive and low surface energy properties of the silicone material. The low modulus silicone material also assists in conformability of the toner to the final substrate.

Examples of suitable silicone rubber materials include room temperature vulcanization (RTV) silicone rubbers; high temperature vulcanization (HIV) silicone rubbers and low temperature vulcanization (LTV) silicone rubbers.

These rubbers are known and readily available commercially such as SILASTIC 735 black RTV and SILASTIC 732 RTV, (Dow Coming); and 106 RTV Silicone Rubber and 90 RTV Silicone Rubber (General Electric). Other suitable silicone materials include the siloxanes (preferably polydimethylsiloxanes); fluorosilicones such as Silicone Rubber 552, (Sampson Coatings); dimethylsilicones; liquid silicone rubbers such as vinyl crosslinked heat curable rubbers or silanol room temperature crosslinked materials; and the like.

The silicone rubber may be present in the outer layer desirably in an amount of from about 10 to about 98%, more desirably from about 25 to about 50% by weight of total solids. The thickness of the silicone rubber layer is desirably from about $2\mu$g to about $125\mu$, particularly from about 8 to about $75\mu$, and more particularly about 12 to about $25\mu$.

The silicone rubber may contain a resistive filler such as carbon black; graphite; boron nitride; metal oxides such as copper oxide, zinc oxide, titanium dioxide, silicone dioxide, and the like, and mixtures thereof. These types of fillers are used to impart electrical or thermal 30 properties that assist in the transfer and release of thicker coatings. Thinner silicone surface coatings with minimal fillers achieve the lowest surface energy possible. If a filler is present, it is preferably present in an amount to aid in imparting the electrical or thermal property, but minimally increasing the surface energy of the total formulation. If a filler is present in the outer silicone layer, it is present in an amount of less than about 20 percent, preferably from about 0.5 to about 20 percent.

A release agent may be used in combination with the transfer member or transfix member. Preferred release agents include low surface energy release agents such as silicones, waxes, fluoropolymers and like materials. Oil or waxed-based release agents tend to cause a silicone rubber outer transfer layer to swell. Therefore, particularly preferred release agents are aqueous silicone polymer release agents such as aqueous polydimethyl siloxane, fluorosilicone, fluoropolymers, and the like. The release agent may desirably be a polydimethyl siloxane release agent that is a liquid emulsion instead of oil-based or wax-based, and comprises cationic electrical control agents or metallic end group polymers to impart cationic electrical conductivity. Examples of commercially available silicone release agents include GE Silicone SM2167 Antistat, SF1023, DF1040, SF1147, SF1265, SF1706, SF18-350, SF96, SM2013, SM2145, SF1154, SM3030, DF104, SF1921, SF1925, SF69, SM2101, SM2658, SF1173, SF1202 and SF1204.

The release agent material may comprise conductive fillers. Suitable conductive fillers include carbon black; graphite; boron nitride; metal oxides such as copper oxide, zinc oxide, titanium dioxide, silicone dioxide, and the like, and mixtures thereof. If a filler is present in the release agent material, it is preferably present in an amount of from about 0.5 to about 40 percent, preferably from about 0.5 to about 15 percent by weight of total solids.

The release agent may be applied to the transfer member as a relatively thin outer coating layer prior to transfer of the developer material. Preferably, the release agent is applied to the transfer member by a wick, roller, or other known application member. The release agent is supplied in an amount of from about 0.1 to about 15 $\mu$l/copy, preferably from about 0.1 to about 2 $\mu$l/copy, and as a thin film covering the silicone rubber outer layer of the transfer member. The thin film of the release agent has a thickness of from about $2\mu$ to about $125\mu$, preferably from about 8 to about $75\mu$, and particularly preferred about 12 to about $25\mu$.

The circumference of the transfer member in a film or belt configuration is from about 8 to about 120 inches, preferably from about 10 to about 110 inches, and more preferably from about 44 to about 10 inches. The width of the film or belt is from about 8 to about 40 inches, preferably from about 10 to about 36 inches, and more preferably from about 10 to about 30 inches. It is preferable that the film be an endless, seamed flexible belt or a seamed flexible belt, which may or may not include puzzle cut seam(s). Examples of such belts are described in U.S. Pat. Nos. 5,487,707 and 5,514,436. A method for manufacturing reinforced seamless belts is set forth in U.S. Pat. No. 5,409,557. Other techniques which can also be used for fabricating films or belts include ultrasonic or impulse welding, and other art-recognized methods.

Layers may be deposited on the substrate via art-recognized coating processes. Known methods for forming layer(s) on the substrate film such as dipping, spraying including multiple spray applications, casting, flow-coating, web-coating, roll-coating, extrusion, molding, laminating, or the like can be used. It is preferred to deposit layers by spraying such as by multiple spray applications of very thin films, casting, by web coating, by flow-coating and most preferably by laminating. Desirably, the coating may be provided as an extruded web coating when using thermoplastic resins; by dip coating on, e.g., aluminum cylinders when using thermosetting or thermoplastic resins; or by injection molding using thermosetting or thermoplastic resins.

The thickness of the substrates or coatings as described herein is from about $2\mu$ to about $125\mu$, preferably from about $8\mu$ to about $75\mu$, and particularly preferred about $12\mu$ to about $25\mu$. The volume resistivity of the transfer member is from about $10^4\Omega$ to about $10^{14}\Omega$, and preferably from about $10^8\Omega$ to about $10^{10}\Omega^2$.

In an electrostatographic printing machine, each image being transferred is formed on an imaging member. The imaging member can take conventional forms such as a photoreceptor belt or drum, an ionographic belt or drum, and the like. The image may then be developed by contacting the latent image with a toner or developer at a developing station. The development system can be either wet or dry. A dry development system is preferable. The developed image is then transferred to an transfer member. The image can be either a single image or a multi-image. In a multi-image system, each of the images may be formed on the imaging member and developed sequentially and then transferred to the transfer member, or in an alternative method, each image may be formed on the imaging member, developed, and transferred in registration to the transfer member.

Figure 1:
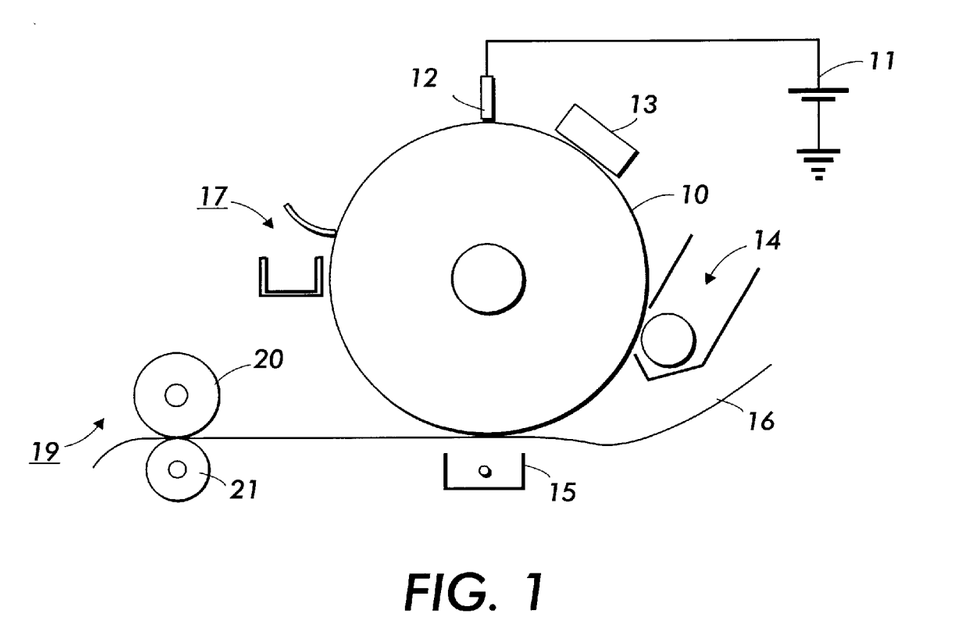
FIG. 1 is a schematic illustration of an image apparatus in accordance with the present invention.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser roll 20 and pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

The transfer members employed for the present invention can be of any suitable configuration. Examples of suitable configurations include sheets, films, webs, foils, strips, coils, cylinders, drums, endless mobius strips, circular discs, belts including endless belts, endless seamed flexible belts, endless seamless flexible belts, and endless belts having puzzle cut seams.

The transfer components of the instant invention may be employed in either an image on image transfer or a tandem transfer of a toned image(s) from the photoreceptor to the transfer component, or in a transfix system for simultaneous transfer and fusing the transferred and developed latent image to the copy substrate. In an image on image transfer, the color toner images are first deposited on the photoreceptor and all the color toner images are then transferred simultaneously to the transfer component. In a tandem transfer, the toner image is transferred one color at a time from the photoreceptor to the same area of the transfer component.

Transfer of the developed image from the imaging member to the transfer element and transfer of the image from the transfer element to the substrate can be by any suitable technique conventionally used in electrophotography, such as corona transfer, pressure transfer, bias transfer, and combinations of those transfer means, and the like. In the situation of transfer from the transfer medium to the substrate, transfer methods such as adhesive transfer, wherein the receiving substrate has adhesive characteristics with respect to the developer material, can also be employed. Typical corona transfer entails contacting the deposited toner particles with the substrate and applying an electrostatic charge on the surface of the substrate opposite to the toner particles. A single wire corotron having applied thereto a potential of between about 5,000 and about 8,000 volts provides satisfactory transfer. In a specific process, a corona generating device sprays the back side of the image receiving member with ions to charge it to the proper potential so that it is tacked to the member from which the image is to be transferred and the toner powder image is attracted from the image bearing member to the image receiving member. After transfer, a corona generator charges the receiving member to an opposite polarity to detach the receiving member from the member that originally bore the developed image, whereupon the image receiving member is separated from the member that originally bore the image.

For color imaging, typically four image forming devices are used. The image forming devices may each comprise an image receiving member in the form of a photoreceptor of other image receiving member. The transfer member of an embodiment of the present invention is supported for movement in an endless path such that incremental portions thereof move past the image forming components for transfer of an image from each of the image receiving members. Each image forming component is positioned adjacent the transfer member for enabling sequential transfer of different color toner images to the transfer member in superimposed registration with one another.

The transfer member moves such that each incremental portion thereof first moves past an image forming component and comes into contact with a developed color image on an image receiving member. A transfer device, which can comprise a corona discharge device, serves to effect transfer of the color component of the image at the area of contact between the receiving member and the transfer member. In a like fashion, image components of colors such as red, blue, brown, green, orange, magenta, cyan, yellow and black, corresponding to the original document also can be formed on the transfer member one color on top of the other to produce a full color image.

A transfer sheet or copy sheet is moved into contact with the toner image on the transfer member. A bias transfer member may be used to provide good contact between the sheet and the toner image at the transfer station. A corona transfer device also can be provided for assisting the bias transfer member in effecting image transfer. These imaging steps can occur simultaneously at different incremental portions of the transfer member. Further details of the transfer method employed herein are set forth in U.S. Pat. No. 5,298,956.

The transfer member herein can be employed in various devices including, without limitation, those described in U.S. Pat. Nos. 3,893,761; 4,531,825; 4,684,238; 4,690,539; 5,119,140; and 5,099,286.

Figure 2:
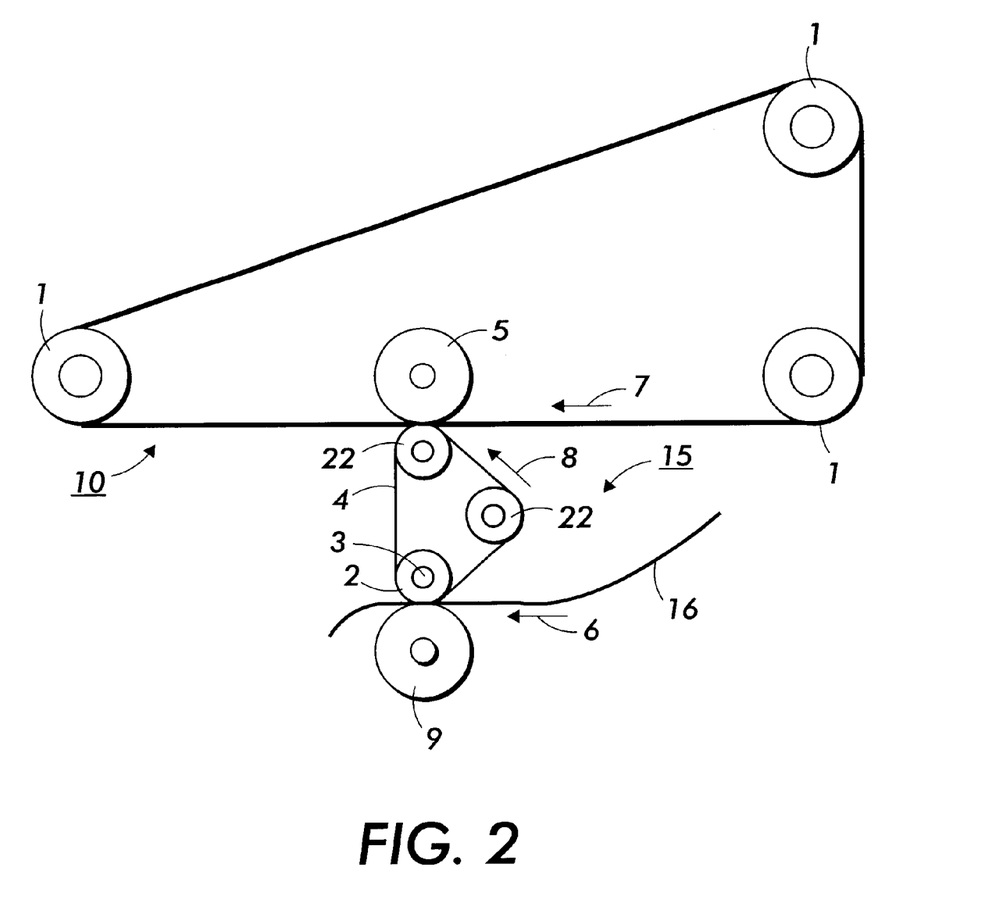
FIG. 2 is an illustration of an embodiment of the present invention, and represents a transfuse member.

Transfer and fusing may occur simultaneously in a transfix/transfuse configuration. As shown in FIG. 2, a transfer apparatus 15 is depicted as transfix belt 4 being held in position by driver rollers 22 and heated roller 2. Heated roller 2 comprises a heater element 3. Transfix belt 4 is driven by driving rollers 22 in the direction of arrow 8. The developed image from photoreceptor 10 (which is driven in direction 7 by rollers 1) is transferred to transfix belt 4 when contact with photoreceptor 10 and belt 4 occurs. Pressure roller 5 aids in transfer of the developed image from photoreceptor 10 to transfix belt 4. The transferred image is subsequently transferred to copy substrate 16 and simultaneously fixed to copy substrate 16 by passing the copy substrate 16 between belt 4 (containing the developed image) and pressure roller 9. A nip is formed by heated roller 2 with heating element 3 contained therein and pressure roller 9. Copy substrate 16 passes through the nip formed by heated roller 2 and pressure roller 9, and simultaneous transfer and fusing of the developed image to the copy substrate 16 occurs.

Figure 3:
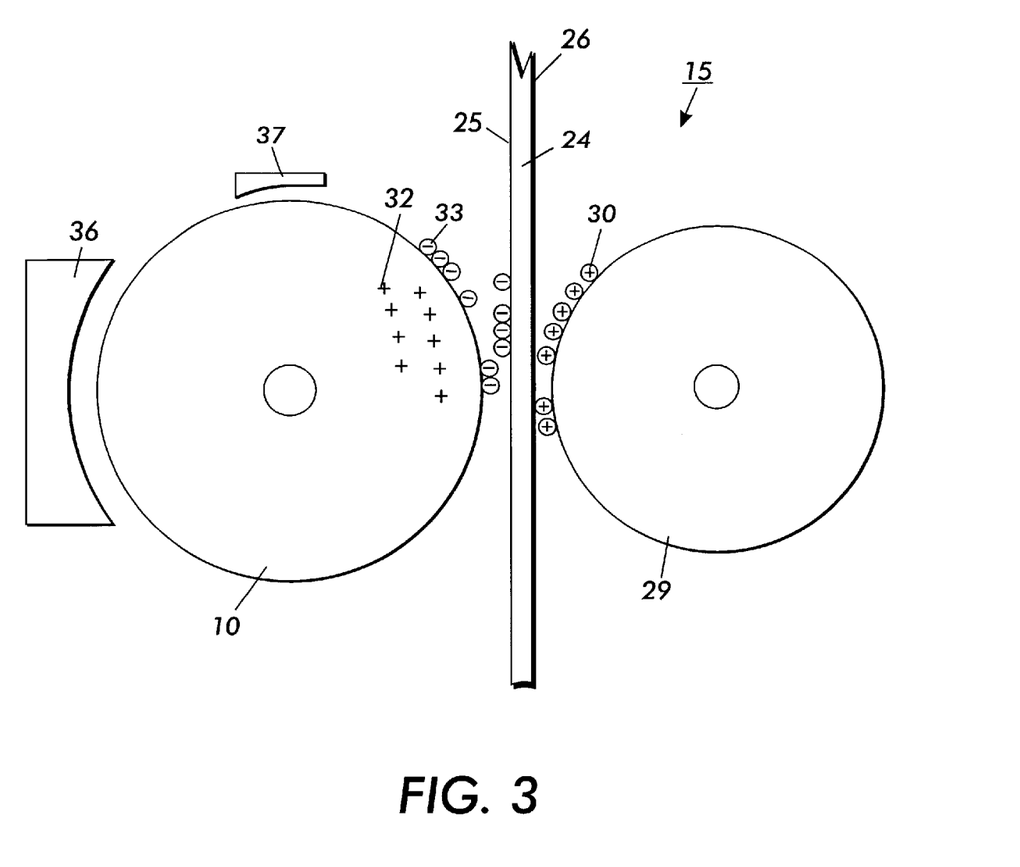
FIG. 3 is a schematic view of an image development system containing a transfer member.

FIG. 3 demonstrates another embodiment of the present invention and depicts a transfer apparatus 15 comprising an transfer member 24 positioned between an imaging member 10 and a transfer roller 29. The imaging member 10 is exemplified by a photoreceptor drum, but other appropriate imaging members may include other electrostatographic imaging receptors such as ionographic belts and drums, and electrophotographic belts.

In the multi-imaging system of FIG. 3, each image being transferred is formed on the imaging drum by image forming station 36. Each of these images is then developed at developing station 37 and transferred to transfer member 24. Each of the images may be formed on the photoreceptor drum 10 and developed sequentially and then transferred to the transfer member 24. In an alternative method, each image may be formed on the photoreceptor drum 10, developed, and transferred in registration to the transfer member 24. In a preferred embodiment of the invention, the multi-image system is a color copying system. In this color copying system, each color of an image being copied is formed on the photoreceptor drum. Each color image is developed and transferred to the transfer member 24. As above, each of the colored images may be formed on the drum 10 and developed sequentially and then transferred to the transfer member 24. In the alternative method, each color of an image may be formed on the photoreceptor drum 10, developed, and transferred in registration to the transfer member 24.

After latent image forming station 36 has formed the latent image on the photoreceptor drum 10 and the latent image of the photoreceptor has been developed at developing station 37, the charged toner particles 33 from the developing station 37 are attracted and held by the photoreceptor drum 10 because the photoreceptor drum 10 possesses a charge 32 opposite to that of the toner particles 33. In FIG. 3, the toner particles are shown as negatively charged and the photoreceptor drum 10 is shown as positively charged. These charges can be reversed, depending on the nature of the toner and the machinery being used.

A biased transfer roller 29 positioned opposite the photoreceptor drum 10 has a higher voltage than the surface of the photoreceptor drum 10. As shown in FIG. 3, biased transfer roller 29 charges the backside 26 of transfer member 24 with a positive charge. In an alternative embodiment of the invention, a corona or any other charging mechanism may be used to charge the backside 26 of the transfer member 24.

The negatively charged toner particles 33 are attracted to the front side 25 of the transfer member 24 by the positive charge 30 on the backside 26 of the transfer member 24.

The transfer member may be in the form of a sheet, web or belt as it appears in FIG. 3, or in the form of a roller or other suitable shape. In a preferred embodiment of the invention, the transfer member is in the form of a belt. In another embodiment of the invention, not shown in the figures, the transfer member may be in the form of a sheet.

EXAMPLE 1

A solution of poly(amic acid) is prepared by dissolving 52.4 g of 4,4'-diaminodiphenyl ether in 516 g of dimethylacetamide and then adding to the solution 57.0 g of pyromellitic dianhydride. A sheet of polyimide is prepared by casting the polyamic acid solution into a sheet, then heating to 300° C. for 2 hours.

EXAMPLE 2

In 4.5 kg of dimethylacetamide is dispersed 100 g of montmorillonite having a cation-exchange capacity of 119 meq/100 g. A composite sheet of polyimide is prepared by casting a dispersion of 5% montmorillonite in polyamic acid solution of Example 1, then heating to 300° C. for 2 hours.

EXAMPLE 3

In 3 L of water is dispersed 100 g of montmorillonite having a cation-exchange capacity of 119 meq/100 g. To the dispersion is added 51.2 g of 12-aminododecanoic acid and 24.1 g of conc. hydrochloric acid (36%), followed by stirring at room temperature for 60 minutes. After thorough rinsing, the intercalated montmorillonite is separated by filtration under reduced pressure using a Buchner funnel. The intercalated montmorillonite is freeze-dried to remove the water, then dispersed in 4.5 kg of dimethylacetamide.

EXAMPLE 4

In 3 L of water is dispersed 100 g of swellable mica having a cation-exchange capacity of 234 meq/100 g. To the dispersion is added 88.2 g of laurylamine and 48.2 g of conc. hydrochloric acid (36%), followed by stirring at room temperature for 60 minutes. After thorough rinsing, the intercalated mica is separated by filtration under reduced pressure using a Buchner funnel. The intercalated mica is freeze-dried to remove the water, then dispersed in 4.5 kg of dimethylacetamide.

EXAMPLE 5

A composite sheet of polyimide in accordance with the invention is prepared by casting a dispersion of 5% montmorillonite of Example 2 in polyamic acid solution of Example 1, then heating to 300° C. for 2 hours.

EXAMPLE 6

A composite sheet of polyimide in accordance with the invention is prepared by casting a dispersion of 10% montmorillonite of Example 2 in polyamic acid solution of Example 1, then heating to 300° C. for 2 hours.

EXAMPLE 7

A composite sheet of polyimide in accordance with the invention is prepared by casting a dispersion of 20% montmorillonite of Example 2 in polyamic acid solution of Example 1, then heating to 300° C. for 2 hours.

EXAMPLE 8

A composite sheet of polyimide in accordance with the invention is prepared by casting a dispersion of 5% organophilic mica of Example 3 in polyamic acid solution of Example 1, then heating to 300° C. for 2 hours.

Transfix/transfuse belts made using the polyimide films in accordance with the above examples are expected to have the properties noted in Table I, below, showing improved life and durability over polyimide belts alone.

| Example | % clay | % organophilic clay | Coefficient of thermal expansion | Predicted photoreceptor belt life |
|---------|--------|---------------------|----------------------------------|-----------------------------------|
| 1 | 0 |   | 0.00003 | ~50,000 prints |
| 2 | 5 |   | 0.000029 | ~50,000 prints |
| 5 |   | 5 | 0.000025 | ~70,000 prints |
| 6 |   | 10 | 0.000015 | ~200,000 prints |
| 7 |   | 20 | 0.00007 | ~400,000 prints |
| 8 |   | 5 | Less than Example 5 | ~70,000 prints |

EQUIVALENTS

Those skilled in the art will recognize, or be able to ascertain using no more than routine experimentation, numerous equivalents to the specific procedures described herein. Such equivalents are considered to be within the scope of the present invention and are covered by the following claims. The contents of all references, issued patents, and published patent applications cited throughout this application are hereby incorporated by reference. The appropriate components, processes, and methods of those patents, applications and other documents may be selected for the present invention and embodiments thereof.

What is claimed is:

1. An electrophotographic transfer member having a substrate comprising a nanosize polymer filler material wherein said nanosize polymer material is selected from the group consisting of particulate organosilicate clay filler material and organophilic clays, wherein the amount of said filler in said substrate is lower than about 10% by weight.

2. The transfer member of claim 1 wherein said organosilicate clay filler material is an organically modified talc-type silica (OMTS) in nanosize particulate form.

3. The transfer member of claim 1 wherein said organophilic clay is an organically modified particulate organically modified mica, bentonite; allophane; kaolinite; halloysite; illite; chlorite; vermiculite; sepiolite; attapulgite; palygorskite; and mixed-layer clay minerals in nanosize particulate form.

4. The transfer member of claim 1, wherein said transfer member is a sheet, a film, a web, a foil, a strip, a coil, a cylinder, a drum, an endless mobius strip, a circular disc, or an endless belt.

5. The transfer member of claim 1, wherein said substrate is selected from the group consisting of epoxy resins, polyethyleneterephthalates, polyvinylfluorides, urethane rubbers, polytetrafluoroethylenes, and polyimides.

6. The transfer member of claim 1, wherein said substrate is a polyimide.

7. The transfer member of claim 1, wherein the amount of said filler in a said substrate is about 5% to about 10% by weight.

8. The transfer member of claim 1, wherein the amount of said filler in said substrate is about 8% by weight.

9. The transfer member of claim 5, wherein said filler material, when dispersed in said substrate, is adapted to lower the expansion coefficient of said transfer member from about 60 to about 38 PPM/°C. at 150° C.

10. An image forming apparatus for forming images on a recording medium comprising:

a charge-retentive surface to receive an electrostatic latent image thereon;

a development component to apply a developer material to said charge-retentive surface to develop said electrostatic latent image to form a developed image on said charge retentive surface;

a reinforced transfer component to transfer said developed image from said charge retentive surface to a copy substrate, said transfer component comprising a transfer substrate containing a filler material adapted for reducing the thermal expansion coefficient of said transfer component; and a fixing component to fuse said transferred developed image to said copy substrate; wherein said filler material, when dispersed in said transfer substrate, is adapted to lower the expansion coefficient of said transfer member from about 60 to about 38 PPM/°C. at 150° C.

11. The apparatus of claim 10, wherein said developer material is a developer comprising toner particles.

12. The apparatus of claim 10 wherein said filler material is an organically modified talc-type silica (OMTS) in nanosize particulate form.

13. The apparatus of claim 10 wherein said filler material is an organophilic clay.

14. The apparatus of claim 10, wherein said transfer component is a sheet, a film, a web, a foil, a strip, a coil, a cylinder, a drum, an endless mobius strip, a circular disc, or an endless belt.

15. The apparatus of claim 10, wherein said transfer component is a polyimide.

16. The apparatus of claim 10, wherein said transfer component is selected from the group consisting of epoxy resins, polyethyleneterephthalates, polyvinylfluorides, urethane rubbers, polytetrafluoroethylenes, and polyimides.

17. The apparatus of claim 10, wherein the amount of said filler in said transfer substrate is lower than about 20% by weight.

18. The apparatus of claim 10, wherein the amount of said filler in said transfer substrate is between about 10% and 2% by weight.

19. The apparatus of claim 10, wherein the amount of said filler in said transfer substrate is about 5% by weight.

20. An image forming apparatus for forming images on a recording medium comprising:

a charge-retentive surface to receive an electrostatic latent image thereon;

a development component to apply a developer material to said charge-retentive surface to develop said electrostatic latent image to form a developed image on said charge retentive surface; and a transfuse component to transfer said developed image from said charge retentive surface to a copy substrate and to fuse said developed image to said copy substrate, said transfuse component comprising a transfuse substrate containing a filler material adapted for reducing the thermal expansion coefficient of said transfuse component;

wherein said filler material, when dispersed in said transfuse substrate, is adapted to lower the expansion coefficient of said transfer member from about 60 to about 38 PPM/°C. at 150° C.

21. The apparatus of claim 20, wherein said filler material is an organosilicate clay.

22. The apparatus of claim 20 wherein said filler material is an organophilic clay.

23. The apparatus of claim 20, wherein said transfuse component is a sheet, a film, a web, a foil, a strip, a coil, a cylinder, a drum, an endless mobius strip, a circular disc, and an endless belt.

24. The apparatus of claim 20, wherein said transfuse component is selected from the group consisting of epoxy resins, polyethyleneterephthalates, polyvinylfluorides, urethane rubbers, polytetrafluoroethylenes, and polyimides.

25. The apparatus of claim 20, wherein said transfuse component is a polyimide.

26. The apparatus of claim 20, wherein the amount of said filler in said transfuse substrate is lower than about 20% by weight.

27. The apparatus of claim 20, wherein the amount of said filler in said transfuse substrate is between about 10% and 2% by weight.

28. The apparatus of claim 20, wherein the amount of said filler in said transfuse substrate is about 5% by weight.

29. The apparatus of claim 20, wherein said developer material is a developer comprising toner particles.

30. The apparatus of claim 21, wherein said organosilicate clay filler material is an organically modified talc-type silica (OMTS) in nanosize particulate form.

31. An electrophotographic transfer member having a substrate comprising a nanosize polymer filler material wherein said nanosize polymer material is selected from the group consisting of a particulate organically modified mica, muscovite, lepidolite, phlogopite or glauconite, a particulate organosilicate clay filler material such as organically modified talc-type silica (OMTS) in nanosize particulate form, organically modified bentonite, montmorillonite; allophane, kaolinite, halloysite, illite, chlorite, vermiculite, sepiolite, attapulgite, palygorskite, and mixed-layer clay minerals in nanosize particulate form having a large aspect ratio generally between 1:100 to 1:1000.

32. The transfer member of claim 31, wherein said transfer member is a sheet, a film, a web, a foil, a strip, a coil, a cylinder, a drum, an endless mobius strip, a circular disc, or an endless belt.

33. The transfer member of claim 31, wherein said substrate is selected from the group consisting of epoxy resins, polyethyleneterephthalates, polyvinylfluorides, urethane rubbers, polytetrafluoroethylenes, and polyimides.

34. The transfer member of claim 31, wherein said substrate is a polyimide.

35. The transfer member of claim 31, wherein the amount of said filler in said substrate is lower than about 10% by weight.

36. The transfer member of claim 31, wherein the amount of said filler in said substrate is between about 10% and 8% by weight.

37. The transfer member of claim 31, wherein the amount of said filler in said substrate is about 8% by weight.

38. The transfer member of claim 33, wherein said filler material, when dispersed in said substrate, is adapted to lower the expansion coefficient of said transfer member from about 60 to about 38 PPM/°C. at 150° C.

39. An electrophotographic transfer member having a substrate comprising a nanosize polymer filler material wherein the substrate is selected from the group consisting of epoxy resins, polyethyleneterephthalates, polyvinylfluorides, urethane rubbers, polytetrefluoroethylenes;

wherein said filler material, when dispersed in said substrate, is adapted to lower the expansion coefficient of said transfer member from about 60 to about 38 PPM/°C. at 150° C.

40. The transfer member of claim 39 wherein said nanosize polymer material is selected from the group consisting of particulate organosilicate clay filler materials and organophilic clays.

41. The transfer member of claim 40 wherein said organosilicate clay filler material is an organically modified talc-type silica (OMTS) in nanosize particulate form.

42. The transfer member of claim 40 wherein said organophilic clay filler material is an organically modified mica, bentonite, allophane, kaolinite, halloysite, illite, chlorite, vermiculite, sepiolite, attapulgite, palygorskite, and mixed-layer clay minerals in nanosize particulate form.

43. The transfer member of claim 39, wherein said transfer member is a sheet, a film, a web, a foil, a strip, a coil, a cylinder, a drum, an endless mobius strip, a circular disc, or an endless belt.

44. The transfer member of claim 39, wherein the amount of said filler in said substrate is lower than about 20% by weight.

45. The transfer member of claim 39, wherein the amount of said filler in said substrate is between about 10% and 2% by weight.

46. The transfer member of claim 39, wherein the amount of said filler in said substrate is about 5% by weight.

\* \* \* \* \*